(12) United States Patent
Donofrio et al.

(10) Patent No.: US 7,765,386 B2
(45) Date of Patent: Jul. 27, 2010

(54) SCALABLE PARALLEL PIPELINE FLOATING-POINT UNIT FOR VECTOR PROCESSING

(75) Inventors: David D. Donofrio, Benicia, CA (US); Michael Dwyer, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/237,548

(22) Filed: Sep. 28, 2005

(65) Prior Publication Data

US 2007/0074009 A1    Mar. 29, 2007

(51) Int. Cl.
G06F 9/00    (2006.01)
(52) U.S. Cl. .............................. 712/222; 712/2; 712/221
(58) Field of Classification Search ................. 712/221, 712/222, 223, 2, 3
See application file for complete search history.

(56) References Cited

U.S. PATENT DOCUMENTS

| | | | |
|---|---|---|---|
| 4,763,294 A * | 8/1988 | Fong .......................... | 708/510 |
| 5,511,210 A * | 4/1996 | Nishikawa et al. ............. | 712/5 |
| 5,887,183 A * | 3/1999 | Agarwal et al. ................ | 712/2 |
| 6,141,673 A * | 10/2000 | Thayer et al. ................ | 708/402 |
| 6,292,886 B1 * | 9/2001 | Makineni et al. ............. | 712/222 |
| 6,530,011 B1 * | 3/2003 | Choquette ...................... | 712/3 |
| 6,839,828 B2 * | 1/2005 | Gschwind et al. ............. | 712/20 |
| 2003/0018676 A1 | 1/2003 | Shaw | |

FOREIGN PATENT DOCUMENTS

EP    682317 A1 * 11/1995

OTHER PUBLICATIONS

Chiueh, Tzi-cker, "Multi-Threaded Vectorization", Proceedings of the Annual Int. Symp. On Comp. Arch., Toronto, 1991, New York, IEEE, US, vol. Symp. 18, pp. 352-361.
Kechadi M-T et al., "Analysis and Simulation of an Out-of-Order Execution Model in Vector Multiprocessor Systems", Parallel Computing, vol. 23, pp. 1863-1986, 1997.

* cited by examiner

*Primary Examiner*—Aimee J Li
(74) *Attorney, Agent, or Firm*—Blakely, Sokoloff, Taylor & Zafman LLP (57) ABSTRACT

An embodiment of the present invention is a technique to perform floating-point operations for vector processing. An input queue captures a plurality of vector inputs. A scheduler dispatches the vector inputs. A plurality of floating-point (FP) pipelines generates FP results from operating on scalar components of the vector inputs dispatched from the scheduler. An arbiter and assembly unit arbitrates use of output section and assembles the FP results to write to the output section.

20 Claims, 9 Drawing Sheets

SCALABLE PARALLEL PIPELINE FLOATING-POINT UNIT FOR VECTOR PROCESSING

BACKGROUND

1. Field of the Invention

Embodiments of the invention relate to the field of microprocessors, and more specifically, to floating-point units.

2. Description of Related Art

Use of floating-point (FP) operations is becoming increasingly prevalent in many areas of computations such as three-dimensional (3-D) computer graphics, image processing, digital signal processing, weather predictions, space explorations, seismic processing, and numerical analysis. Specially designed floating-point units have been developed to enhance FP computational power in computer systems. Many of FP applications involve vector processing. Floating-point processors (FPP's) designed for vector processing typically employ a pipeline architecture.

Existing techniques for pipelined FPP's typically use a single deep pipeline for vector processing. While this approach may be simple and sufficient for some applications, it has a number of drawbacks for highly intensive vector processing. It is difficult to modify the architecture when the problem size changes, either increasing or decreasing. There may also be deadlocks, leading to low pipeline utilization. Simple instructions may have the same latency as complex instructions, leading to inefficient use of pipelines. Other disadvantages may include low throughput, throughput dependency on vector population, etc.

BRIEF DESCRIPTION OF THE DRAWINGS

Embodiments of invention may best be understood by referring to the following description and accompanying drawings that are used to illustrate embodiments of the invention. In the drawings.

DESCRIPTION

An embodiment of the present invention is a technique to perform floating-point operations for vector processing. An input queue captures a plurality of vector inputs. A scheduler dispatches the vector inputs. A plurality of floating-point (FP) pipelines generates FP results from operating on scalar components of the vector inputs dispatched from the scheduler. An arbiter and assembly unit arbitrates use of output section and assembles the FP results to write to the output section.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

One embodiment of the invention is a technique to perform FP operations efficiently for vector processing. The technique employs a FP unit (FPU) architecture that uses multiple shallow pipelines instead of a single deep pipeline. This provides a high degree of scalability in computing power and buffer depths. By varying the number of pipelines, the architecture may accommodate any computational requirements. An incoming vector input is decomposed or broken into a set of independent scalar components that are forwarded to the multiple FP pipelines to be processed in parallel. A simple arbitration scheme assigns the FP results to an output buffer and re-assembles the entire vector result in an asynchronous manner. Such an out-of-order completion may allow short latency and simple instructions to complete before long latency and complex instructions, leading to high throughput. The arbitration scheme also provides an improved deadlock prevention leading to high pipeline utilization by assigning the output buffer space as commands complete rather than at dispatch time.

Figure 1A:
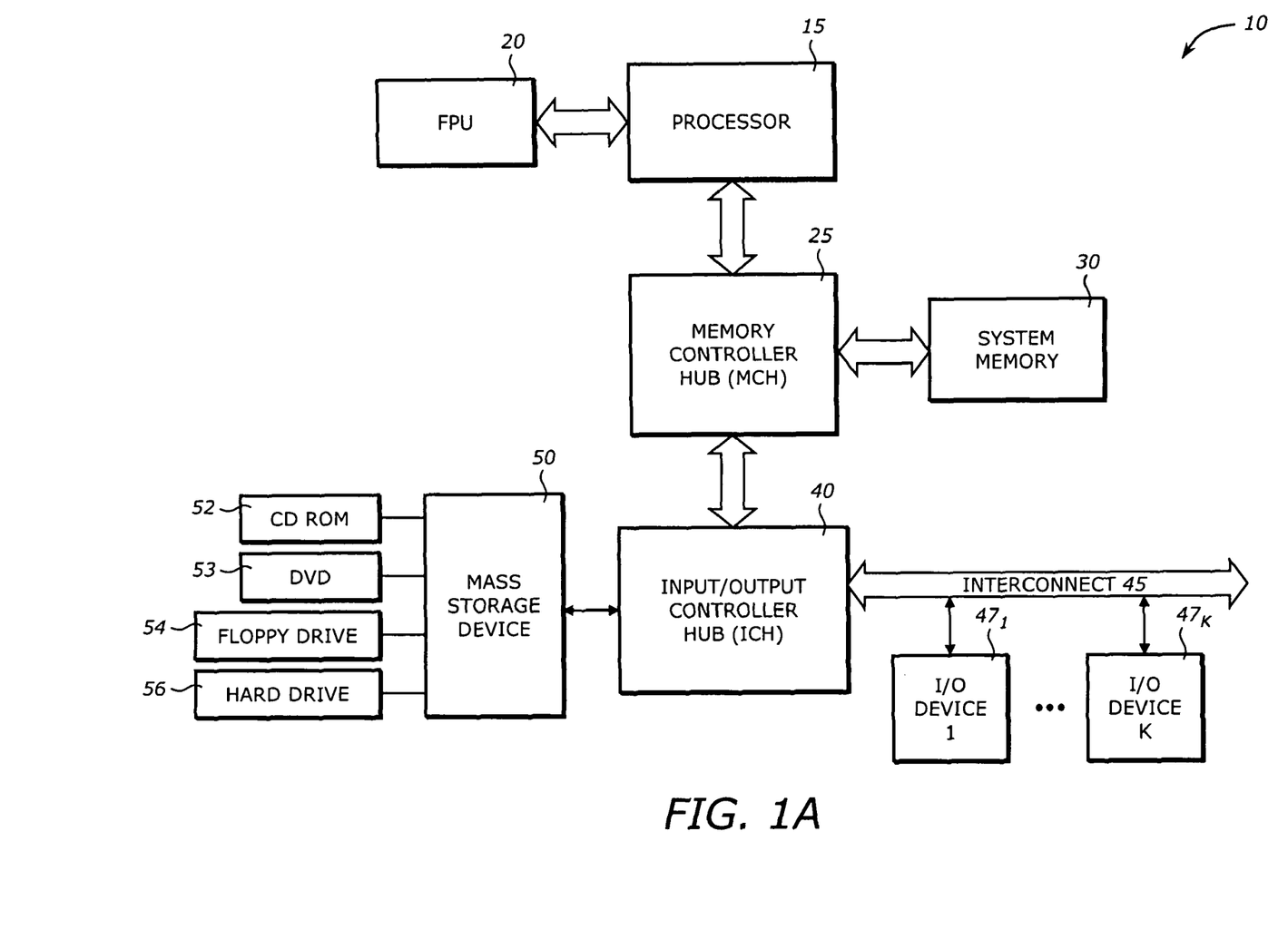
FIG. 1A is a diagram illustrating a processing system in which one embodiment of the invention can be practiced.

FIG. 1A is a diagram illustrating a processing system 10 in which one embodiment of the invention can be practiced. The system 10 includes a processor unit 15, a floating-point unit (FPU) 20, a memory controller hub (MCH) 25, a main memory 30, an input/output controller hub (IOH) 40, an interconnect 45, a mass storage device 50, and input/output (I/O devices $47_1$ to $47_K$.

The processor unit 15 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The FPU 20 is a co-processor that performs floating-point operations for vector processing. It may have direct interface to the processing unit 15 and may share system resources with the processing unit 15 such as memory space. The processing unit 15 and the FPU 20 may exchange instructions and data including vector data and FP instructions. The FPU 20 may also be viewed as an input/output (I/O) processor that occupies an address space of the processing unit 15. It may also be interfaced to the MCH 25 instead of directly to the processor unit 15. It uses a highly scalable architecture with multiple FP pipelines for efficient vector processing.

The MCH 25 provides control and configuration of memory and input/output devices such as the main memory 30 and the ICH 40. The MCH 25 may be integrated into a chipset that integrates multiple functionalities such as graphics, media, isolated execution mode, host-to-peripheral bus interface, memory control, power management, etc. The MCH 25 or the memory controller functionality in the MCH 25 may be integrated in the processor unit 15. In some embodiments, the memory controller, either internal or external to the processor unit 15, may work for all cores or processors in the processor unit 15. In other embodiments, it may include different portions that may work separately for different cores or processors in the processor unit 15.

The main memory 30 stores system code and data. The main memory 30 is typically implemented with dynamic random access memory (DRAM), static random access memory (SRAM), or any other types of memories including those that do not need to be refreshed. The main memory 30 may be accessible to the processor unit 15 or both of the processor unit 15 and the FPU 20.

The ICH 40 has a number of functionalities that are designed to support I/O functions. The ICH 40 may also be integrated into a chipset together or separate from the MCH 20 to perform I/O functions. The ICH 40 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, etc.

The interconnect 45 provides interface to peripheral devices. The interconnect 45 may be point-to-point or connected to multiple devices. For clarity, not all the interconnects are shown. It is contemplated that the interconnect 45 may include any interconnect or bus such as Peripheral Component Interconnect (PCI), PCI Express, Universal Serial Bus (USB), and Direct Media Interface (DMI), etc.

The mass storage device 50 stores archive information such as code, programs, files, data, and applications. The mass storage device 50 may include compact disk (CD) read-only memory (ROM) 52, digital video/versatile disc (DVD) 53, floppy drive 54, and hard drive 56, and any other magnetic or optic storage devices. The mass storage device 50 provides a mechanism to read machine-accessible media. The I/O devices $47_1$ to $47_K$ may include any I/O devices to perform I/O functions. Examples of I/O devices $47_1$ to $47_K$ include controller for input devices (e.g., keyboard, mouse, trackball, pointing device), media card (e.g., audio, video, graphic), network card, and any other peripheral controllers.

Figure 1B:
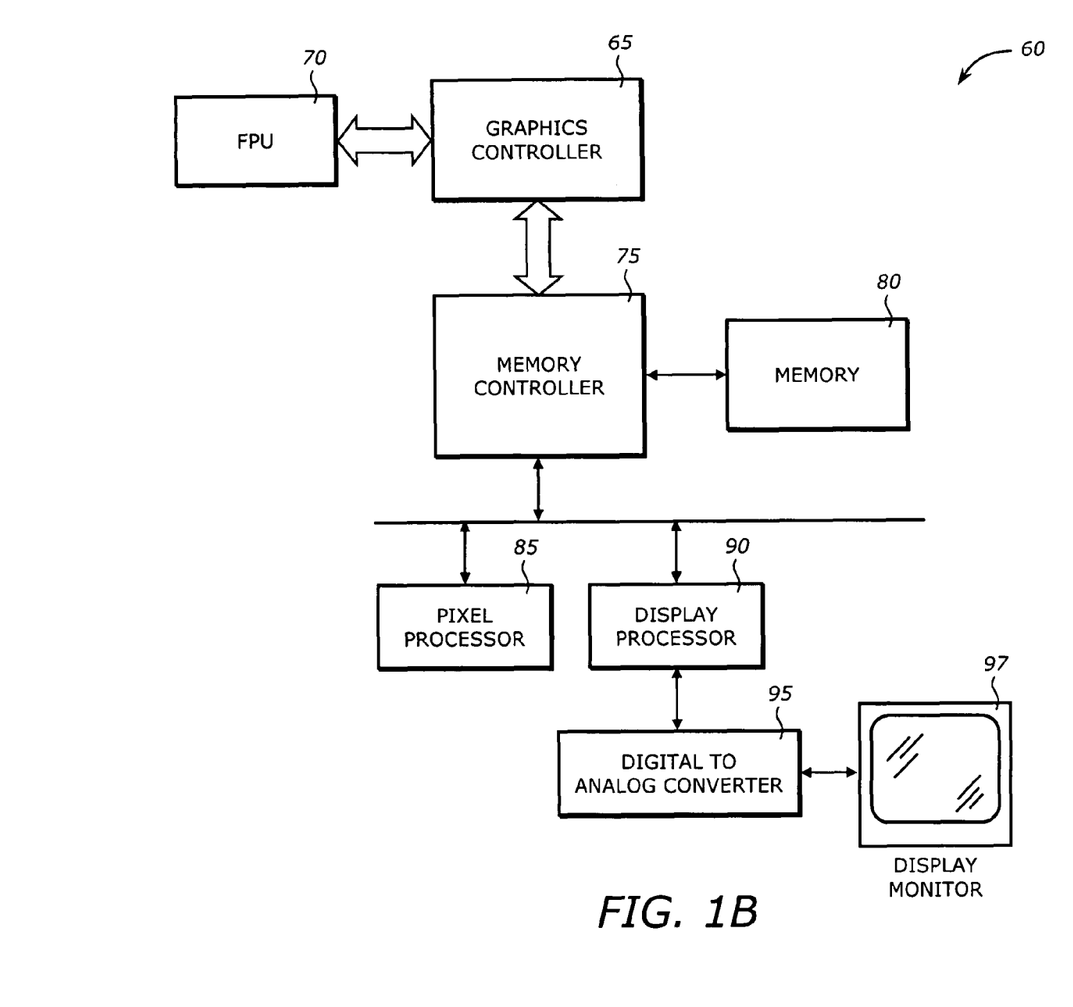
FIG. 1B is a diagram illustrating a graphics system in which one embodiment of the invention can be practiced.

FIG. 1B is a diagram illustrating a graphics system 60 in which one embodiment of the invention can be practiced. The graphics system 60 includes a graphics controller 65, a floating-point unit (FPU) 70, a memory controller 75, a memory 80, a pixel processor 85, a display processor 90, a digital-to-analog converter (DAC) 95, and a display monitor 97, The graphics controller 65 is any processor that has graphic capabilities to perform graphics operations such as fast line drawing, two-dimensional (2-D) and three-dimensional (3-D) graphic rendering functions, shading, anti-aliasing, polygon rendering, transparency effect, color space conversion, alpha-blending, chroma-keying, etc. The FPU 70 is essentially similar to the FPU 20 shown in FIG. 1A. It performs floating-point operations on the graphic data. It may receive FP instructions and FP vector inputs from, and return the FP results to the graphics controller 65. The memory controller 75 performs memory control functions similar to the MCH 25 in FIG. 1A. The memory 80 includes SRAM or DRAM memory devices to store instructions and graphic data processed by the graphic controller 60 and the FPU 70.

The pixel processor 85 is a specialized graphic engine that can perform specific and complex graphic functions such as geometry calculations, affine conversions, model view projections, 3-D clipping, etc. The pixel processor 85 is also interfaced to the memory controller 70 to access the memory 80 and/or the graphic controller 65. The display processor 90 processes displaying the graphic data and performs display-related functions such as palette table look-up, synchronization, backlight controller, video processing, etc. The DAC 95 converts digital display digital data to analog video signal to the display monitor 97. The display monitor 97 is any display monitor that displays the graphic information on the screen for viewing. The display monitor 97 may be a Cathode Ray Tube (CRT) monitor, a television (TV) set, a Liquid Crystal Display (LCD), a Flat Panel, or a Digital CRT.

Figure 2:
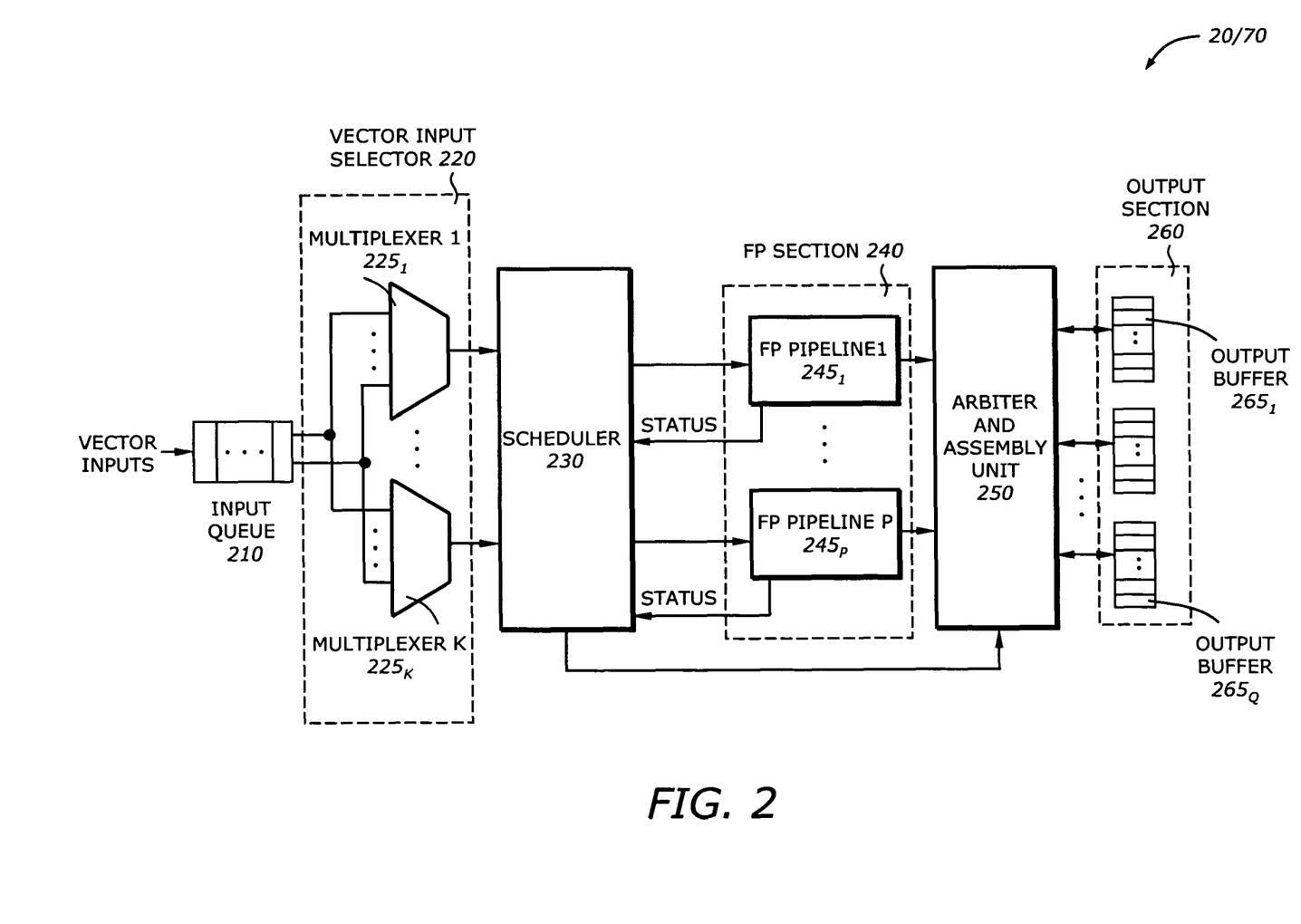
FIG. 2 is a diagram illustrating a FPU according to one embodiment of the invention.

FIG. 2 is a diagram illustrating the FPU 20/70 according to one embodiment of the invention. The FPU 20/70 includes an input queue 210, a vector input selector 220, a scheduler 230, a FP section 240, an arbiter and assembly unit 250, and an output section 260.

The input queue 210 captures or stores the vector inputs to be processed from the processor unit 15 (FIG. 1), the graphics controller 60 (FIG. 2), or a data storage that stores the vector inputs. Each of the vector inputs includes a FP instruction and the vector data associated with the instruction. The FP instruction may be any FP operation such as FP addition, FP subtraction, FP multiplication, FP division, FP trigonometric function, etc. The vector data may include a number of scalar components. The vector width may be any width (e.g., 64 bits, 128 bits). The input queue 210 may be implemented by a first in first out (FIFO) memory having appropriate depth and width, or may be flat, in effect exposing all entries at the same time, or some combination thereof. In other embodiments, the input queue 210 may be a buffer memory without restrictions on ordering.

The vector input selector 220 selects the vector inputs from the input queue 210 to send to the scheduler 230. It may include K multiplexers $225_1$ to $225_K$. Each multiplexer has a number of inputs connected one or more outputs of the input queue 210. The selection of the vector inputs may be based on suitable criteria.

The scheduler 230 receives the vector inputs selected by the vector input selector 220 and dispatches floating point operations contained within the vector inputs to the FP section 240 for processing depending on the FP instructions, the availability of the FP section 240, and optionally other criteria specific to the implementation. The scheduler 230 assigns a unique identification (ID) or serial number to each of the vector inputs and forward the unique IDs of the vector inputs to the arbiter and assembly unit 250, and includes this ID with each operation dispatched to the FP section 240.

The FP section 240 performs the FP operations on the dispatched vector inputs according to the FP instructions. It may include P FP pipelines $245_1$ to $245_P$ operating in parallel and independently from one another. The number P may be any number suitable for the application. The P FP pipelines $245_1$ to $245_P$ may be the same or different. They may include individual FP pipelines designed to perform specific FP operations, such as FP adder, FP subtractor, FP divider, FP multiplier, FP complex mathematical functions (e.g., trigonometric functions), etc. The P FP pipelines $245_1$ to $245_P$ may have the same or different depths resulting in the same or different latencies. The scheduler 230 dispatches an operation to one of the P FP pipelines $245_1$ to $245_P$ according to the FP instruction associated with the vector input and whether the FP pipeline is available or free. Each of the P FP pipelines $245_1$ to $245_P$ generates a status signal to the scheduler 230 to indicate whether it is capable of accepting an additional FP operation or is unavailable. If a FP pipeline is unavailable and the FP instruction calls for the use of this FP pipeline, the scheduler 230 keeps the corresponding vector input in a waiting queue until the FP pipeline or another suitable FP pipeline is available. Each of the P FP pipelines $245_1$ to $245_P$ generates a FP result at the output.

The arbiter and assembly unit 250 writes the FP results from the FP section 240 to the output section 260. The arbiter and assembly unit 250 arbitrates the use of the output section when there are multiple FP results available at the output of the FP section 240. When there is a winner among the FP results, it writes the FP result to an assigned output buffer in the output section at an appropriate location. In essence, the arbiter and assembly unit 250 assemble the FP results for each result vector after all the scalar components of a vector input are processed.

The output section 260 stores the FP results written by the arbiter and assembly unit 250. The FP results may be emptied, read, or consumed by another unit such as the processor unit 15, the graphics controller 60, or any other consuming entity for further processing. The output section 260 includes Q output buffers $265_1$ to $265_Q$. Each output buffer has sufficient storage capacity to store a result vector. The output buffers may be implemented as registers or memory. Each of the Q output buffers $265_1$ to $265_Q$ has a status signal to indicate whether it has obtained all the scalar components of a vector result and whether its contents have been emptied, read, or consumed by other consuming entity in the system. The arbiter and assembly unit 250 monitors these status signals to determine if an output buffer is available or free for writing.

Figure 3:
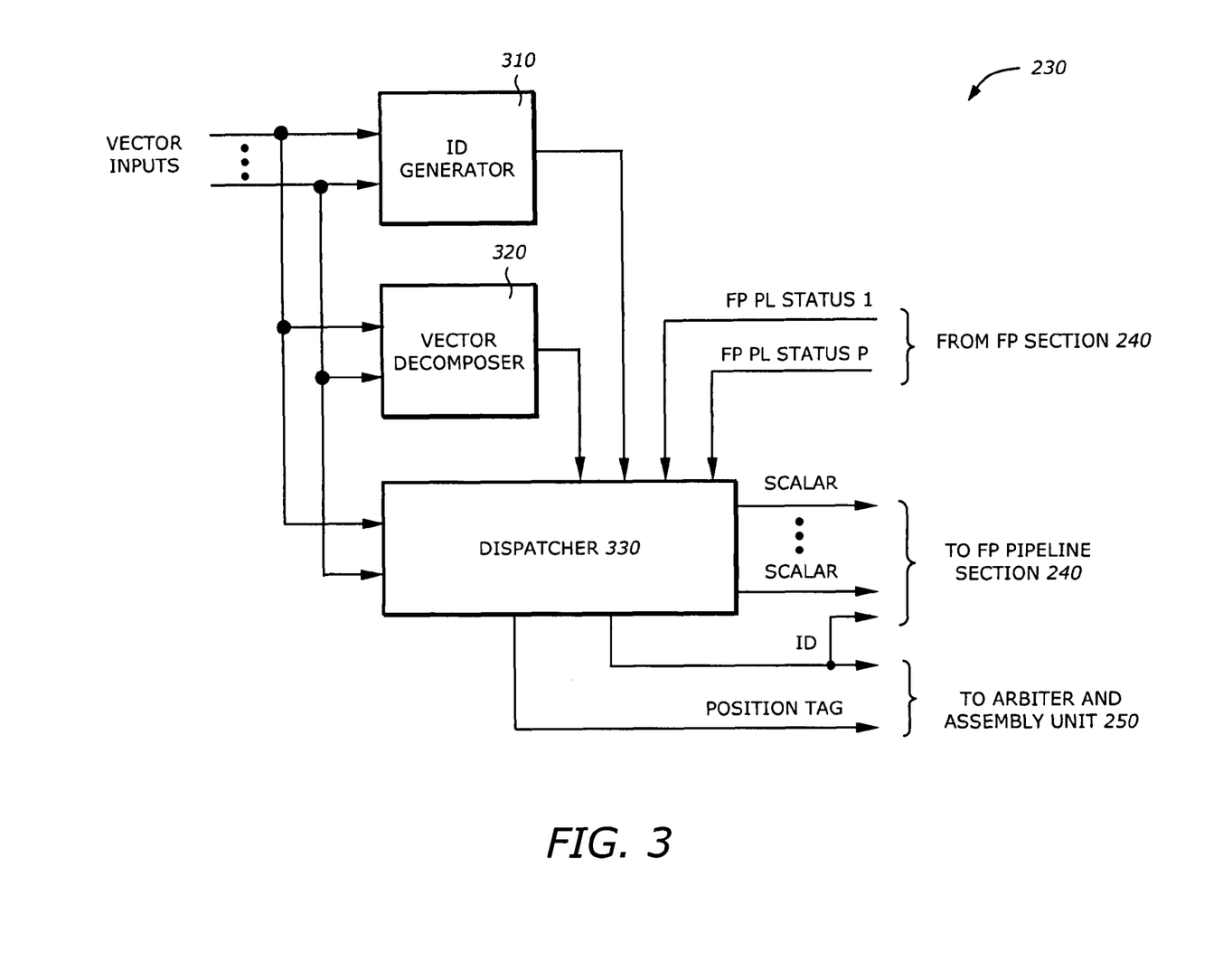
FIG. 3 is a diagram illustrating a scheduler according to one embodiment of the invention.

FIG. 3 is a diagram illustrating the scheduler 230 shown in FIG. 2 according to one embodiment of the invention. The scheduler 230 includes an ID generator 310, a vector decomposer 320, and a dispatcher 330.

The ID generator 310 generates a unique ID for a vector input scheduled to be dispatched. The unique ID may be generated sequentially or incrementally according to the order the vector inputs arrive in the input queue 210 or selected by the vector input selector 220. The ID may be within zero to k where k is greater than the number of unique vector instructions that can be contained in the P FP pipelines $245_1$ to $245_P$ shown in FIG. 2. This unique ID is dispatched together with the scalar component to a FP pipeline in the FP section 240 and is propagated through the associated FP pipeline to its output along with the FP result. It is also used by the arbiter and assembly unit 250 to assign an FP result to an output buffer and assemble all the FP results belonging to the same ID to the assigned output buffer in the output section 260.

The vector decomposer 320 decomposes a vector input into a plurality of scalar components. Each of the scalar components has a scalar position tag indicating its position in the associated input vector. The vector decomposer 320 forwards the decomposed scalar components and their position tags to the dispatcher 330.

The dispatcher 330 receives the status signals of the FP pipelines $245_1$ to $245_P$ in the FP section 240 to determine their availability and sends the scalar components to the available FP pipelines in the FP section 240. It also forwards the IDs and the position tags of the vector inputs and their scalar components to the arbiter and assembly unit 250.

Figure 4:
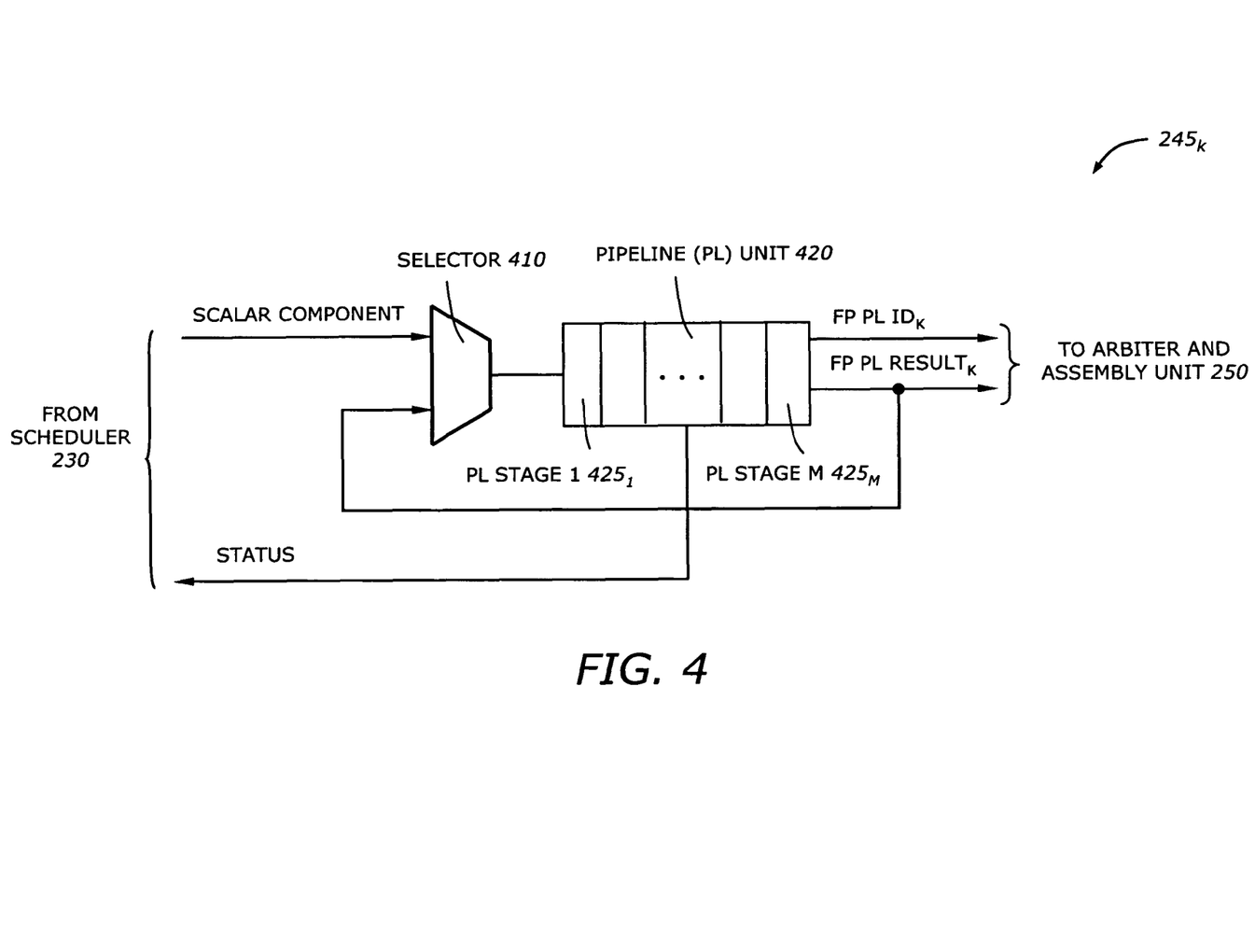
FIG. 4 is a diagram illustrating a FP pipeline according to one embodiment of the invention.

FIG. 4 is a diagram illustrating a FP pipeline $245_k$ shown in FIG. 2 according to one embodiment of the invention. The FP pipeline $245_k$ includes a selector 410 and a pipeline (PL) unit 420.

The selector 410 selects a scalar component sent from the scheduler 230 and a FP result at the output of the PL unit 420. The FP result is re-circulated when its ID is not matched with the ID assigned by the arbiter and assembly unit 250. The re-circulated FP result is tagged with a null operation so that it may be propagated through the PL unit unmodified, preserving its value. The selector 410 may be implemented as a multiplexer at the input of the PL unit 420.

The PL unit 420 performs floating-point operation on the scalar component. It has M PL stages $425_1$ to $425_M$. The depth M may be any suitable depth depending on the scalability and/or throughput requirements. It generates a FP PL result at the output to the arbiter and assembly unit 250. In addition, the ID of the vector input that the scalar component belongs to, and the position tag within that vector are also propagated along the M PL stages $425_1$ through $425_M$. This FP PL ID is matched to the ID assigned by the arbiter and assembly unit 250 to determine if the associated FP PL result may be written to an output buffer or re-circulated back to the selector 410. If the operation is incomplete such as when an additional pass is required for computational purposes, or the operation is complete and there is no match, the FP PL result is re-circulated waiting for an output buffer to become available. If the operation is complete and there is a match, the FP PL result is written to an appropriate location of the assigned output buffer using the corresponding position tag. The PL unit 420 also generates a status signal to the schedule 230 to indicate whether it is busy or available for processing a scalar component.

Figure 5:
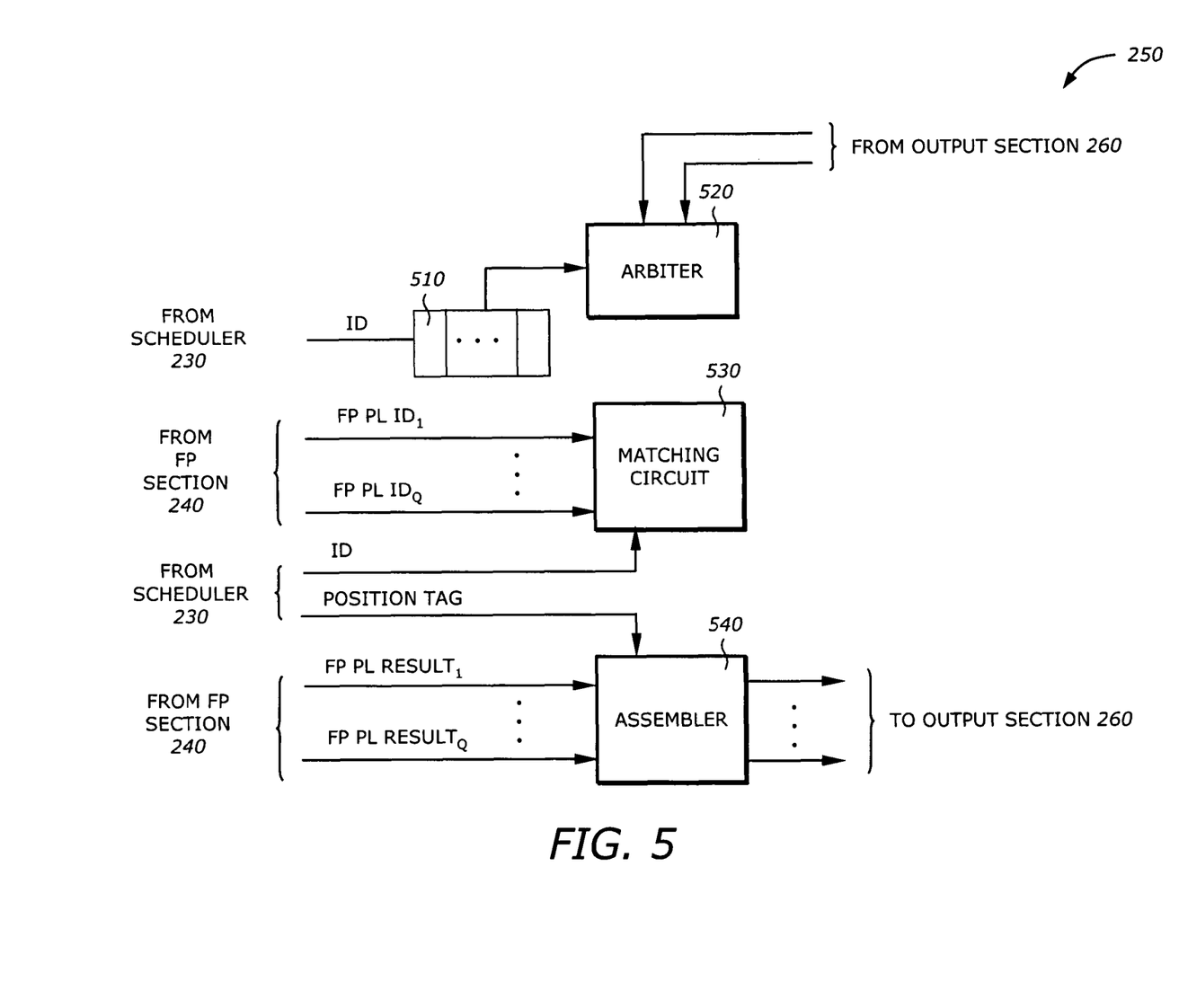
FIG. 5 is a diagram illustrating an arbiter and assembly unit according to one embodiment of the invention.

FIG. 5 is a diagram illustrating an arbiter and assembly unit 250 according to one embodiment of the invention. The arbiter and assembly unit 250 includes an ID queue 510, an arbiter 520, a matching circuit 530, and an assembler 530.

The ID queue 510 stores the ID's sent from the scheduler 230. It may be implemented by a FIFO or any other suitable storage mechanism. Its depth depends on the number P of the parallel FP pipelines, scalability and/or throughput requirements. In addition, multiple ID's may be made available to the arbiter 520.

The arbiter 520 receives the ID's from the ID queue 510 and the status signals from the output section 260. The status signals are provided by the output buffers to indicate whether they are available. The arbiter 520 assigns the ID to an output buffer in the output section 260 if that output buffer is available. The arbiter 520 may assign the ID's to the output buffers using a round robin, a first in first out, or any other suitable assignment scheme. Once an output buffer is assigned an ID, it uses that assigned ID until all the scalar components are written into it. The arbiter 520 then forwards all the assigned ID's to the matching circuit 530. By deferring the buffer assignment at the arbiter 520, deadlock prevention may be improved, leading to high pipeline utilization.

The matching circuit 530 matches the ID's associated with the FP PL results at the outputs of the FP pipelines $245_1$ to $245_P$ in the output section 260 with the assigned IDs. If there is any match, it sends the matching result to the assembler 530. For any FP PL ID that is not matched, the corresponding FP pipeline re-circulates its FP PL result back to its input. The matching circuit 530 may match the FP PL IDs with a single assigned ID or multiple assigned ID's. Matching multiple assigned ID's may provide higher throughput because it allows an instruction associated with a short latency pipeline to pass an instruction associated with a long latency pipeline. The matching circuit 530 may be implemented by a number of comparators performing comparisons in parallel. The comparator may be formed by L exclusive OR gates to perform bit-wise comparisons followed by an L-input OR gate where L is the word size of the ID, or an equivalent logic circuit.

The assembler 540 receives the result of the matching circuit 530, the position tags from the scheduler 230 and the FP PL results from the FP section 240. It writes the FP result that has the ID matched with the assigned ID to the output buffer at a location indicated by the corresponding scalar position tag.

Figure 6:
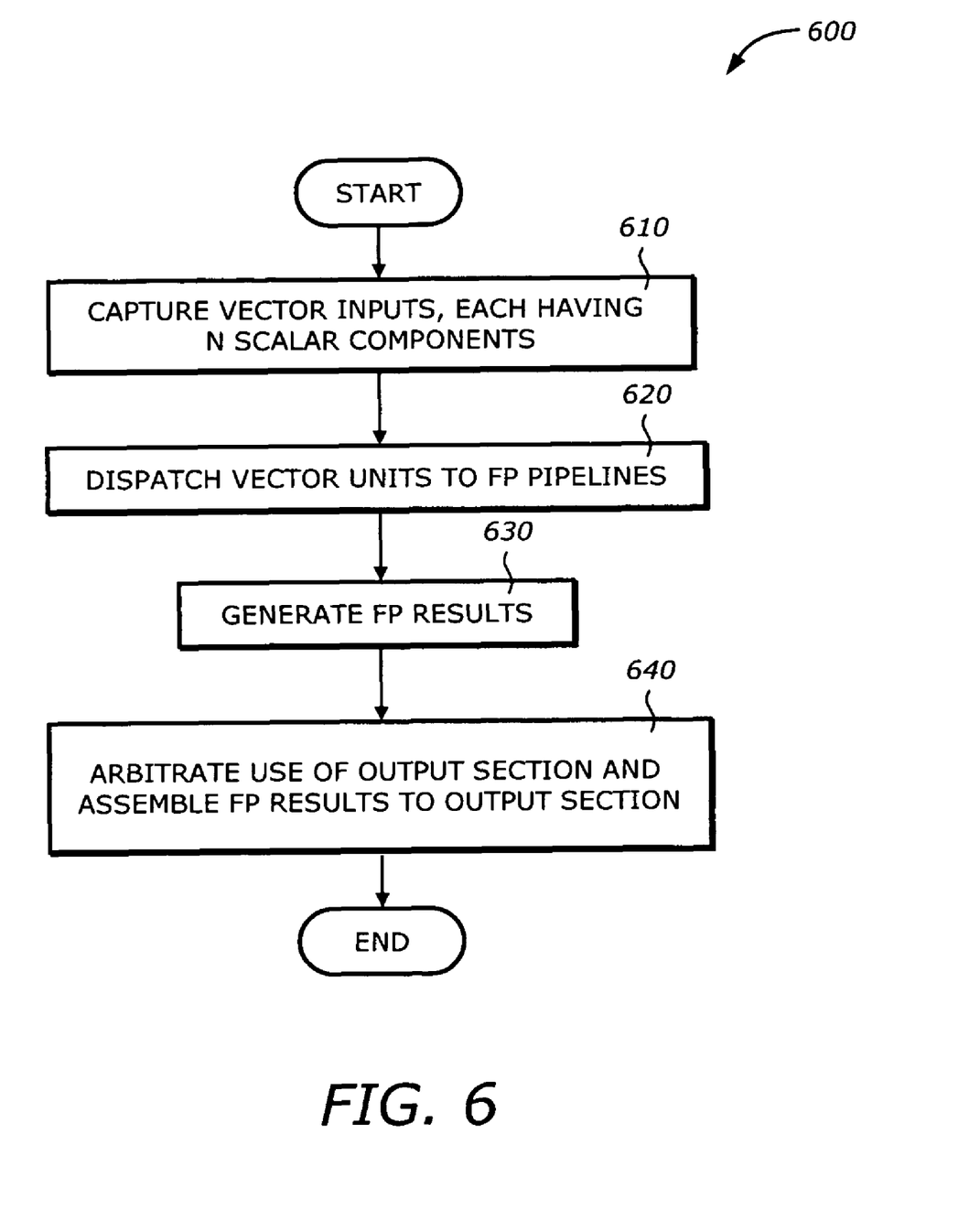
FIG. 6 is a flowchart illustrating a process to perform FP operations for vector processing according to one embodiment of the invention.

FIG. 6 is a flowchart illustrating a process 600 to perform FP operations for vector processing according to one embodiment of the invention.

Upon START, the process 600 captures the vector inputs (Block 610). Each of the vector inputs has N scalar components. Then, the process 600 dispatches the vector inputs to the FP pipelines according to the FP instructions and the availability of the FP pipelines (Block 620). Next, the process 600 generates the FP results by performing FP operations on the vector inputs (Block 630). Then, the process 600 arbitrates the use of the output section and assembles the FP results to the output section (Block 640) and is then terminated.

Figure 7:
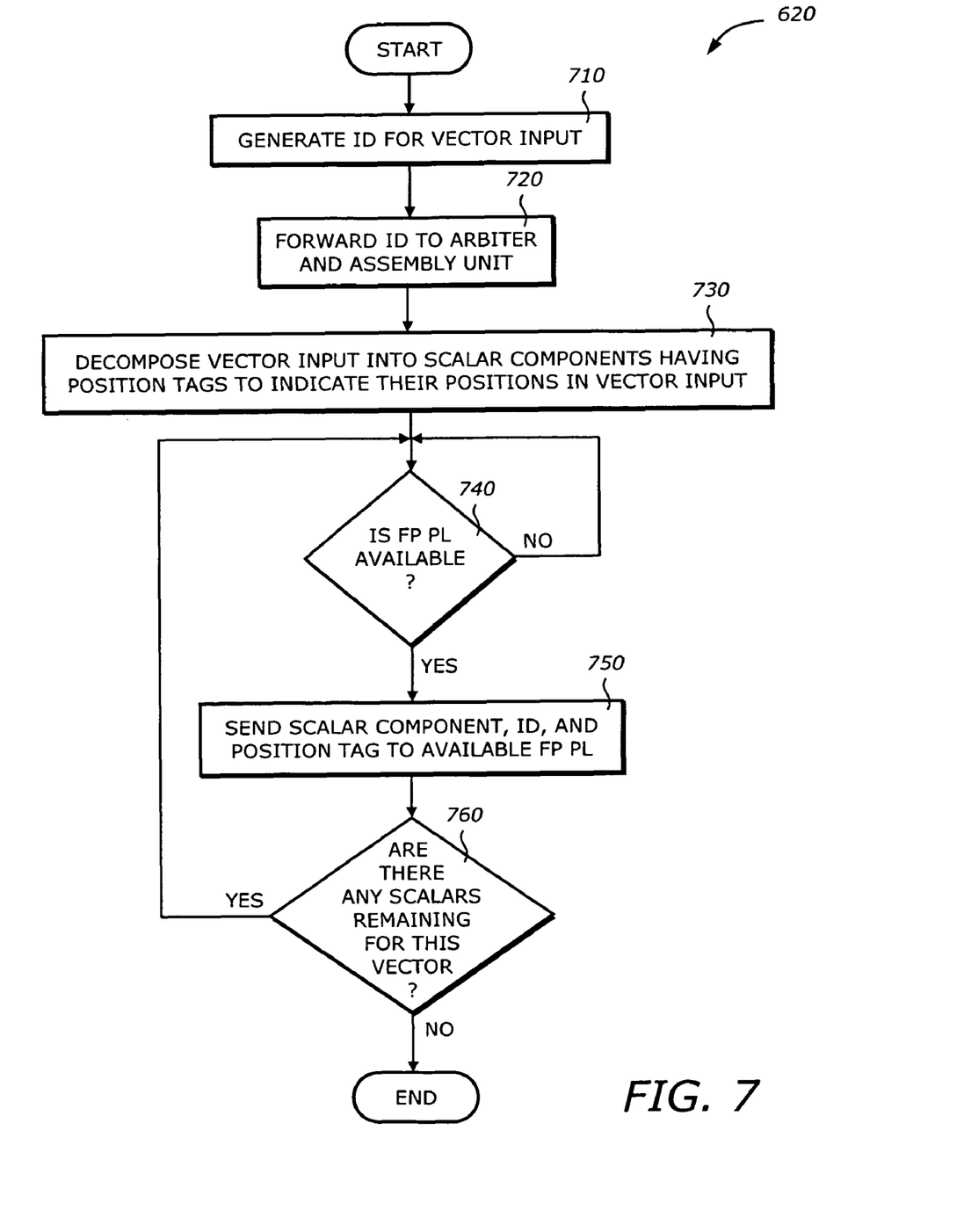
FIG. 7 is a flowchart illustrating a process to dispatch vector inputs according to one embodiment of the invention.

FIG. 7 is a flowchart illustrating the process 620 shown in FIG. 6 to dispatch vector inputs according to one embodiment of the invention.

Upon START, the process 620 generates an ID for the vector input (Block 710). The ID is unique for each vector input. Then, the process 620 forwards the ID to the arbiter and assembly unit (Block 720). Next, the process 620 decomposes the vector input into scalar components and associates each scalar component with a scalar position tag to indicate its position in the vector input (Block 730). Next, the process 620 determines if a FP pipeline for a scalar component is available (Block 740). If not, the process 620 returns to Block 740 to wait for an available FP pipeline. Otherwise, the process 620 sends the scalar component, the ID, and the position tag to the available FP pipeline (Block 750).

Next, the process 620 determines if there are any scalar components remaining for this vector (Block 760). If so, the process 620 returns to Block 740 to continue waiting for an available FP pipeline. Otherwise, the process 620 is terminated.

Figure 8:
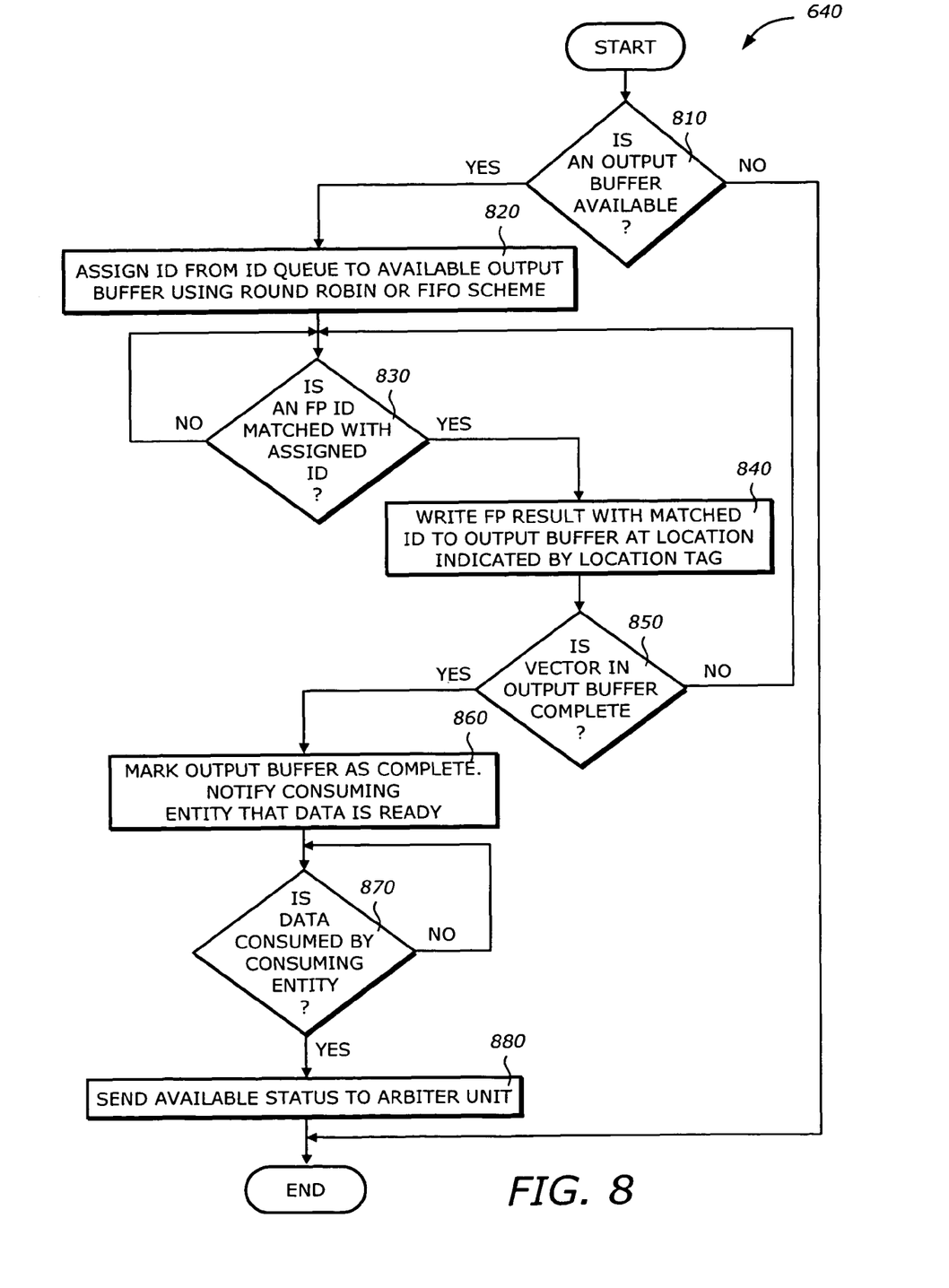
FIG. 8 is a flowchart illustrating a process to arbitrate and assemble according to one embodiment of the invention.

FIG. 8 is a flowchart illustrating the process 640 shown in FIG. 6 to arbitrate and assemble according to one embodiment of the invention.

Upon START, the process 640 determines if an output buffer is available (Block 810). If not, the process 640 is terminated. Otherwise, the process 640 assigns an ID from the ID queue to the available output buffer (Block 820). The assignment may be done using a round robin, a first in first out, or any other suitable assignment scheme. Next, the process 640 determines if a FP ID of a completed operation at the output of a FP pipeline matched with the assigned ID (Block 830). If not, the process 640 returns to Block 830 to continue checking. Since the FP pipelines operate independently with each other and in parallel, eventually, there will be a FP ID that is matched with the assigned ID. If there is a match, the process 640 writes the FP result with the matched ID to the output buffer at the location indicated by the location tag associated with the FP result (Block 840).

Next, the process 640 determines if the vector in the output buffer is completed (Block 850). A vector in the output buffer is completed when all the scalar components of the vector are written into the output buffer. If not complete, the process 640 returns to Block 830 to check for subsequent matches. Otherwise, the process 640 marks the output buffer complete and notifies a consuming entity that the result data is ready (Block 860). The consuming entity may be the processor 15 or the graphics controller 65 shown in FIGS. 1A and 1B. Then, the process 640 determines if the result data has been consumed by the consuming entity (Block 870). If not, the process 640 returns to Block 870 to continue checking. Otherwise, the process 640 sends the available status to the arbiter unit to indicate that the output buffer is now available to receive a new result data (Block 880). The process 640 is then terminated and sends an available status to the arbiter and assembly unit after the output buffer is emptied out (Block 860) and is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
   an input queue to capture a plurality of vector inputs, each of the vector inputs including a floating-point (FP) instruction and vector data associated with the FP instruction;
   a scheduler coupled to the input queue to dispatch operations in the vector inputs based on at least availability of a FP section;
   a plurality of FP pipelines in the FP section coupled to the scheduler to generate FP results from operating on scalar components of the vector inputs dispatched from the scheduler; and
   an arbiter and assembly unit coupled to the plurality of FP pipelines to arbitrate use of an output section when there are multiple FP results available at the output section and assemble the FP results to write to the output section.

2. The apparatus of claim 1 wherein the scheduler comprises:
   an identifier generator to generate an identification (ID) for a vector input in the plurality of vector inputs;
   a vector decomposer to decompose the vector input into the scalar components, each of the scalar components having a position tag indicating position of the scalar component in the associated input vector; and
   a dispatcher coupled to the identifier generator and the vector decomposer to send the scalar components and the position tag to the FP pipelines, the dispatcher forwarding the ID to the arbiter and assembly unit.

3. The apparatus of claim 2 wherein the arbiter and assembly unit comprises:
   an arbiter to assign the ID to an output buffer in the output section;
   a matching circuit to match the ID of the FP results with assigned ID; and
   an assembler to write the FP result that has the ID matched with the assigned ID to the output buffer at a location indicated by the scalar position tag.

4. The apparatus of claim 3 wherein each of the FP pipeline comprises:
   an input selector to select one of the scalar components sent from the scheduler and a FP result that is re-circulated when an additional pass is required or when the ID is not matched with the assigned ID.

5. The apparatus of claim 3 wherein the arbiter and assembly unit further comprises:
   an ID queue to store the ID dispatched from the scheduler.

6. The apparatus of claim 5 wherein the arbiter assigns the ID from the ID queue according to one of a round robin and first in first out schemes.

7. The apparatus of claim 3 wherein the arbiter assigns the ID to the output buffer that is available.

8. A method comprising:
capturing a plurality of vector inputs in an input queue, each of the vector inputs including a floating-point (FP) instruction and vector data associated with the FP instruction;
dispatching operations in the vector inputs using a scheduler based on at least availability of a FP section;
generating FP results from operating on scalar components of the vector inputs dispatched from the scheduler using a plurality of FP pipelines in the FP section;
arbitrating use of an output section when there are multiple FP results available at the output section storing the FP result using an arbiter and assembly unit; and
assembling the FP results to the output section.

9. The method of claim 8 wherein the dispatching comprises:
generating an identification (ID) for a vector input in the plurality of vector inputs;
decomposing the vector input into the scalar components, each of the scalar components having a position tag indicating position of the scalar component in the associated input vector;
sending the scalar components and the position tag to the FP pipelines; and
forwarding the ID to the arbiter and assembly unit.

10. The method of claim 9 wherein the arbiter and assembly unit comprises:
assigning the ID to an output buffer in the output section;
matching the ID of the FP results with assigned ID; and
writing the FP result that has the ID matched with the assigned ID to the output buffer at a location indicated by the scalar position tag.

11. The method of claim 10 further comprising:
selecting one of the scalar components sent from the scheduler and a FP result that is re-circulated when an additional pass is required or when the ID is not matched with the assigned ID to one of the plurality of FP pipelines.

12. The method of claim 10 wherein arbitrating comprises:
storing the ID dispatched from the scheduler in an ID queue.

13. The method of claim 12 wherein arbitrating comprises assigning the ID from the ID queue according to one of a round robin and first in first out schemes.

14. The method of claim 10 wherein arbitrating comprises assigning the ID to the output buffer that is available.

15. A system comprising:
a graphics controller to process graphic data;
a memory coupled to the graphics controller to store the graphic data; and
a floating-point unit (FPU) coupled to the graphics controller to perform floating-point operations on the graphic data, the FPU comprising:
an input queue to capture a plurality of vector inputs, each of the vector inputs including a floating-point (FP) instruction and vector data associated with the FP instruction,
a scheduler coupled to the input queue to dispatch operations in the vector inputs based on at least availability of a FP section,
a plurality of FP pipelines in the FP section coupled to the scheduler to generate FP results from operating on scalar components of the vector inputs dispatched from the scheduler, and
an arbiter and assembly unit coupled to the plurality of FP pipelines to arbitrate use of an output section when there are multiple FP results available at the output section and assemble the FP results to write to the output section.

16. The system of claim 15 wherein the scheduler comprises:
an identifier generator to generate an identification (ID) for a vector input in the plurality of vector inputs;
a vector decomposer to decompose the vector input into the scalar components, each of the scalar components having a position tag indicating position of the scalar component in the associated input vector; and
a dispatcher coupled to the identifier generator and the vector decomposer to send the scalar components and the position tag to the FP pipelines, the dispatcher forwarding the ID to the arbiter and assembly unit.

17. The system of claim 16 wherein the arbiter and assembly unit comprises:
an arbiter to assign the ID to an output buffer in the output section;
a matching circuit to match the ID of the FP results with assigned ID; and
an assembler to write the FP result that has the ID matched with the assigned ID to the output buffer at a location indicated by the scalar position tag.

18. The system of claim 17 wherein each of the FP pipeline comprises:
an input selector to select one of the scalar components sent from the scheduler and a FP result that is re-circulated when an additional pass is required or when the ID is not matched with the assigned ID.

19. The system of claim 17 wherein the arbiter and assembly unit further comprises:
an ID queue to store the ID dispatched from the scheduler.

20. The system of claim 19 wherein the arbiter assigns the ID from the ID queue according to one of a round robin and first in first out schemes.

* * * * *